US011037305B2

(12) United States Patent
Zhan et al.

(10) Patent No.: US 11,037,305 B2
(45) Date of Patent: Jun. 15, 2021

(54) METHOD AND APPARATUS FOR PROCESSING POINT CLOUD DATA

(71) Applicant: Baidu Online Network Technology (Beijing) Co., Ltd., Beijing (CN)

(72) Inventors: Yifei Zhan, Beijing (CN); Miao Yan, Beijing (CN); Wang Zhou, Beijing (CN); Xiong Duan, Beijing (CN); Xianpeng Lang, Beijing (CN); Changjie Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 89 days.

(21) Appl. No.: 16/235,668

(22) Filed: Dec. 28, 2018

(65) Prior Publication Data

US 2019/0206063 A1 Jul. 4, 2019

(30) Foreign Application Priority Data

Dec. 29, 2017 (CN) .......................... 201711477530.5

(51) Int. Cl.
*G06K 9/00* (2006.01)
*G06T 7/246* (2017.01)
(Continued)

(52) U.S. Cl.
CPC ............ *G06T 7/246* (2017.01); *G01S 7/4802* (2013.01); *G01S 7/4808* (2013.01); *G01S 17/58* (2013.01);
(Continued)

(58) Field of Classification Search
CPC ........ G01S 17/931; G01S 17/58; G01S 17/89; G01S 7/4808; G01S 7/4802; G01S 17/86;
(Continued)

(56) References Cited

U.S. PATENT DOCUMENTS 9,086,481 B1 7/2015 Dowdall et al.
2011/0282581 A1* 11/2011 Zeng .................... G01S 7/4808
701/301
(Continued)

FOREIGN PATENT DOCUMENTS

CN 101615291 A 12/2009
CN 105793730 A 7/2016
(Continued)

OTHER PUBLICATIONS

Wang, et al., "Depth Motion Detection—A Novel RS-Trigger Temporal Logic based Method," IEEE Signal Processing Letters, vol. 21, No. 6, Jun. 2014, 5 pages.

*Primary Examiner* — Samir A Ahmed
(74) *Attorney, Agent, or Firm* — Knobbe, Martens, Olson & Bear, LLP

(57) ABSTRACT

Implementations of the present disclosure can include a method and apparatus for processing point cloud data. Specifically, the method for processing point cloud data can be provided, including: acquiring a first frame and a second frame respectively from the point cloud data; extracting a first candidate object from the first frame and a second candidate object corresponding to the first candidate object from the second frame, respectively; determining a first location of the first candidate object and a second location of the second candidate object in a coordinate system of the point cloud data, respectively; and identifying any one of the first candidate object and the second candidate object as a moving object, in response to an offset between the first location and the second location.

19 Claims, 12 Drawing Sheets

(51) Int. Cl.
*G01S 7/48* (2006.01)
*G01S 17/89* (2020.01)
*G01S 17/58* (2006.01)
*G01S 17/931* (2020.01)
*G06K 9/62* (2006.01)
*G01S 17/86* (2020.01)

(52) U.S. Cl.
CPC ............ *G01S 17/89* (2013.01); *G01S 17/931* (2020.01); *G06K 9/00765* (2013.01); *G06K 9/6218* (2013.01); *G01S 17/86* (2020.01); *G06T 2207/10028* (2013.01); *G06T 2207/30241* (2013.01)

(58) Field of Classification Search
CPC ........ G06K 9/6218; G06T 2207/30241; G06T 2207/100283
See application file for complete search history.

(56) References Cited

U.S. PATENT DOCUMENTS

| | | | |
|---|---|---|---|
| 2014/0037194 A1* | 2/2014 | Kitamura | G01B 11/24 382/154 |
| 2014/0368807 A1 | 12/2014 | Rogan | |
| 2016/0321820 A1* | 11/2016 | Ely | G06T 7/246 |
| 2016/0328827 A1* | 11/2016 | Ilic | H04N 5/2624 |
| 2017/0075356 A1 | 3/2017 | Delp | |
| 2017/0115396 A1 | 4/2017 | Uehara | |
| 2017/0291718 A1* | 10/2017 | McNeill | G01S 17/89 |
| 2018/0232947 A1* | 8/2018 | Nehmadi | G01S 13/89 |
| 2018/0341263 A1* | 11/2018 | Rust | G01S 17/58 |

FOREIGN PATENT DOCUMENTS

| | | |
|---|---|---|
| JP | 2009075117 A | 4/2009 |
| JP | 2016529475 A | 9/2016 |
| JP | 2017027202 A | 2/2017 |
| JP | 2017194787 A | 10/2017 |

\* cited by examiner

METHOD AND APPARATUS FOR PROCESSING POINT CLOUD DATA

CROSS-REFERENCE TO RELATED APPLICATIONS

This application claims priority to Chinese Patent Application No. 201711477530.5, filed on Dec. 29, 2017, titled "Method and Apparatus for Processing Point Cloud Data," which is hereby incorporated by reference in its entirety.

TECHNICAL FIELD

Embodiments of the present disclosure mainly relate to the field of data processing, and more specifically to a method and apparatus for processing point cloud data.

BACKGROUND

With the development of three-dimensional scanning technology and digital map technology, a technical solution for acquiring three-dimensional data of a city and constructing a three-dimensional model by using an acquisition entity (for example, an acquisition vehicle) provided with an acquisition device (for example, a laser scanner) has now been proposed. For stationary objects such as buildings, roads, and trees, it is now possible to construct a corresponding three-dimensional model based on the acquired point cloud data. However, since there may be a large number of moving objects such as moving vehicles, bicycles, and pedestrians on urban roads, the point cloud data acquired by the acquisition device may include undesired data associated with the moving objects.

Traditional point cloud data processing solutions rely heavily on manual processing by modellers. In addition, The technical solution for determining the moving object by performing image recognition using image data associated with the point cloud data has also been proposed. However, the existing technical solutions rely heavily on manual operations and require complicated calculations, and still cannot accurately recognize the moving objects.

SUMMARY

Implementations of the present disclosure provide a solution for processing point cloud data.

In a first aspect, the present disclosure provides a method for processing point cloud data. Specifically, the method includes: acquiring a first frame and a second frame respectively from the point cloud data; extracting a first candidate object in the first frame and a second candidate object corresponding to the first candidate object in the second frame, respectively; determining a first location of the first candidate object and a second location of the second candidate object in a coordinate system of the point cloud data, respectively; and identifying any one of the first candidate object and the second candidate object as a moving object, in response to an offset between the first location and the second location.

In a second aspect, the present disclosure provides an apparatus for processing point cloud data. Specifically, the apparatus includes: an acquisition module, configured to acquire a first frame and a second frame respectively from the point cloud data; an extraction module, configured to extract a first candidate object in the first frame and a second candidate object corresponding to the first candidate object in the second frame, respectively; a determination module, configured to determine a first location of the first candidate object and a second location of the second candidate object in a coordinate system of the point cloud data, respectively; and an identification module, configured to identify any one of the first candidate object and the second candidate object as a moving object, in response to an offset between the first location and the second location.

In a third aspect, the present disclosure provides a device, including one or more processors; and a storage apparatus, for storing one or more programs, the one or more programs, when executed by the one or more processors, cause the one or more processors to implement the method according to the first aspect of the present disclosure.

In a fourth aspect, the present disclosure provides a computer readable storage medium, storing a computer program thereon, the computer program, when executed by a processor, implements the method according to the first aspect of the present disclosure.

It should be understood that the content described in the Summary section is not intended to limit the key or important features of the embodiments of the present disclosure, or to limit the scope of the present disclosure. Other features of the present disclosure will be readily understood by the following description.

BRIEF DESCRIPTION OF THE DRAWINGS

The above and other features, advantages and aspects of the embodiments of the present disclosure will become more apparent with reference to the following description and in combination with the accompanying drawings. In the accompanying drawings, the identical or similar reference numerals indicate the identical or similar elements.

DETAILED DESCRIPTION OF EMBODIMENTS

Embodiments of the present disclosure will be described in more detail below with reference to the accompanying drawings. Although certain embodiments of the present disclosure are shown in the accompanying drawings, it should be understood that the present disclosure may be implemented in a variety of forms, and should not be construed as being limited to the embodiments set forth herein. The embodiments are provided to provide a more thorough and complete understanding of the present disclosure. It should be understood that the accompanying drawings and the embodiments of the present disclosure are only illustrative and are not intended to limit the scope of the present disclosure.

In the description of the embodiments of the present disclosure, the term "include" and variants thereof should be understood as open-ended, i.e., "including but not limited to." The term "based on" should be understood as "at least partially based on." The term "one embodiment" or "the embodiment" should be understood as "at least one embodiment." The terms "first," "second," and the like may refer to different or identical objects. Other explicit and implicit definitions may also be included below.

Figure 1:
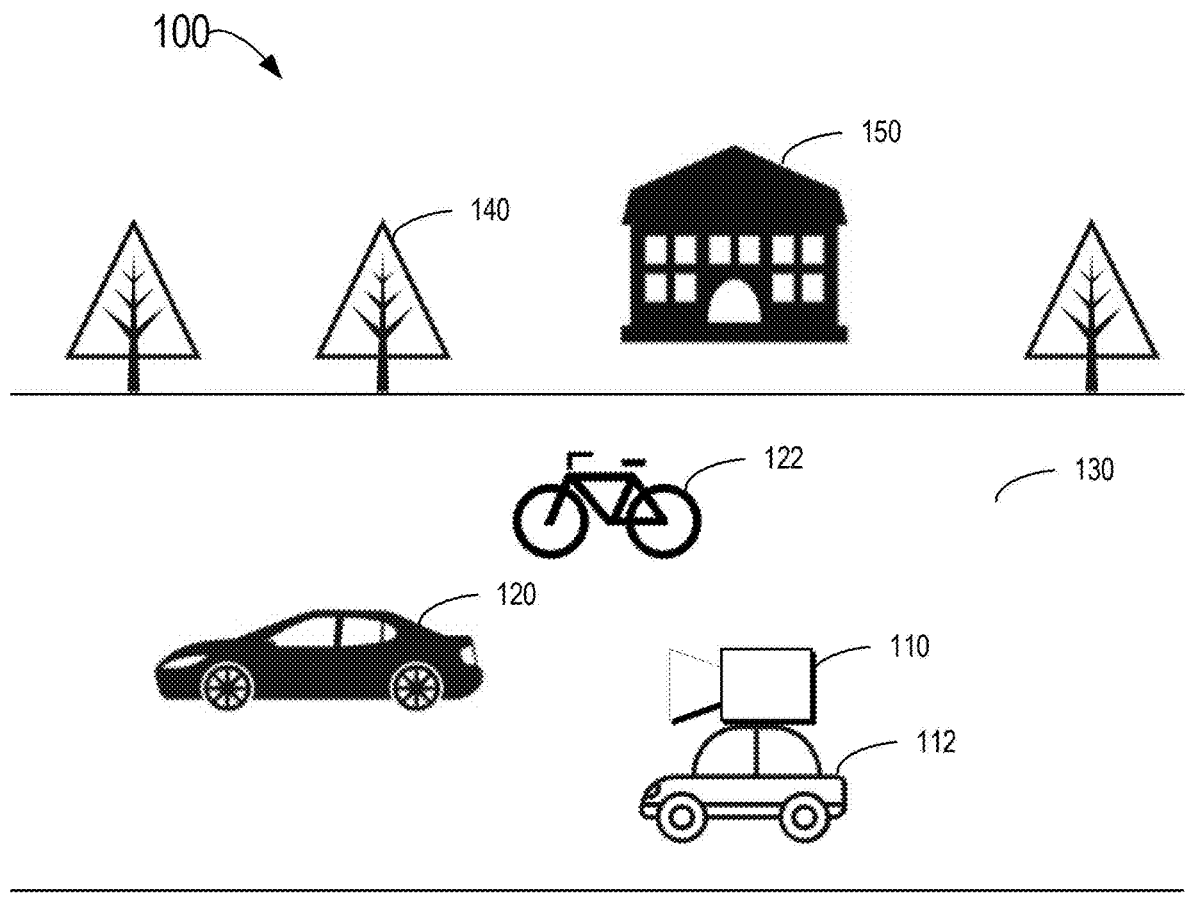
FIG. 1 schematically shows an illustration of an application environment according to an embodiment of the present disclosure.

FIG. 1 schematically shows an illustration of an application environment according to an embodiment of the present disclosure, where an illustrative process of acquiring point cloud data is illustrated. Specifically, real objects involved in the urban environment may include stationary objects and moving objects. For example, the stationary objects may include the urban road 130, the trees 140, the building 150, and the like as shown in FIG. 1. In addition, the real object may also include moving objects such as the vehicle 120 and the bicycle 122 moving on the road 130. Although not shown in FIG. 1, other moving objects such as pedestrians may also be involved.

As shown in FIG. 1, the acquisition device 110 may be secured to the acquisition entity 112. When the acquisition entity 112 is moving along the road 130 in an urban environment, the acquisition device 110 may emit a laser beam outward and receive signals from the respective stationary objects and moving objects, thereby acquiring three-dimensional data associated with the stationary objects and the moving objects. In this implementation, the three-dimensional data may be point cloud data.

It should be noted that the acquisition device 110 may acquire three-dimensional data at predetermined time intervals. Similar to video signals captured by a camera, the point cloud data acquired by the acquisition device 110 may include a plurality of frames, where each frame includes point cloud data acquired by the acquisition device 110 at a time point corresponding to the frame. The acquisition frequency of the acquired point cloud data may vary depending on the brand and model and other parameters of the acquisition device 110. For example, the acquisition frequency of point cloud data from an acquisition device 110 may be 10 frames/second, and the acquisition frequency of point cloud data from another acquisition device 110 may be 5 frames/second.

Figure 2:
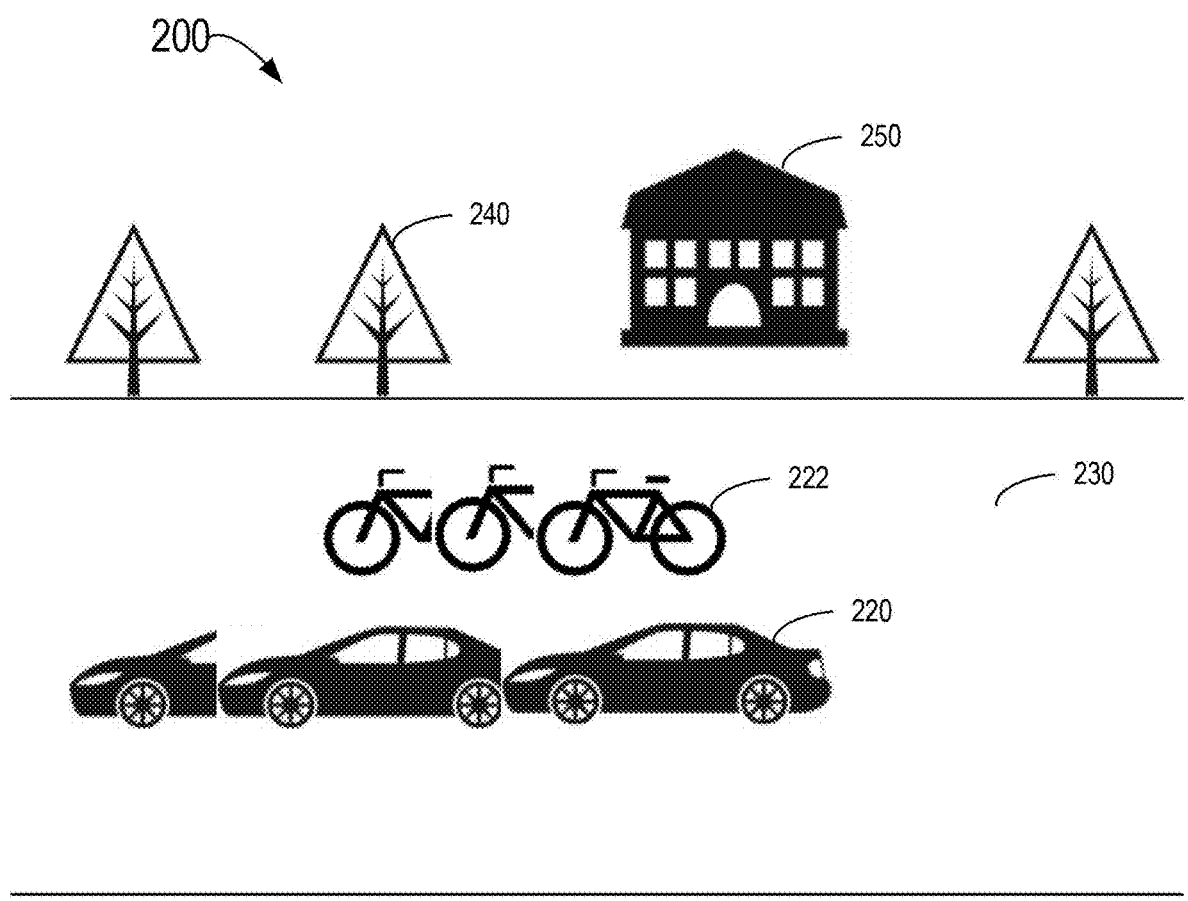
FIG. 2 schematically shows an illustration of point cloud data obtained according to a technical solution according to an embodiment of the present disclosure.

Referring to FIG. 2, if frames in the acquired point cloud data are directly spliced to form a final point cloud data describing the urban environment, the part in the point cloud data associated with the moving object may form ghosting. FIG. 2 schematically shows an illustration of point cloud data 200 obtained according to a technical solution. As shown, for a stationary object such as the road, the tree, or the building, the locations of the stationary object in the coordinate system of the point cloud data are identical in different frames of the point cloud data. Thus, in the final point cloud data 200, the parts 230, 240 and 250 associated with the stationary object are normal.

However, when the acquisition entity 112 moves along the road 130, since the moving objects such as the vehicle 120 and the bicycle 122 are moving, in the different frames of the point cloud data acquired by the acquisition device 110, each of the vehicle 120 and the bicycle 122 has different locations in the coordinate system of the point cloud data. This results in ghosting of the parts 220 and 222 associated with the moving objects such as the vehicle and the bicycle in the final point cloud data 200.

Existing technical solutions rely on manual operations to remove ghosting in point cloud data. Although other technical solutions are proposed at present, these technical solutions require complicated calculations and cannot accurately recognize moving objects and eliminate ghosting. Therefore, how to process point cloud data in a more efficient and convenient approach, recognize and eliminate parts associated with the moving objects in the point cloud data becomes a research hotspot.

Figure 3:
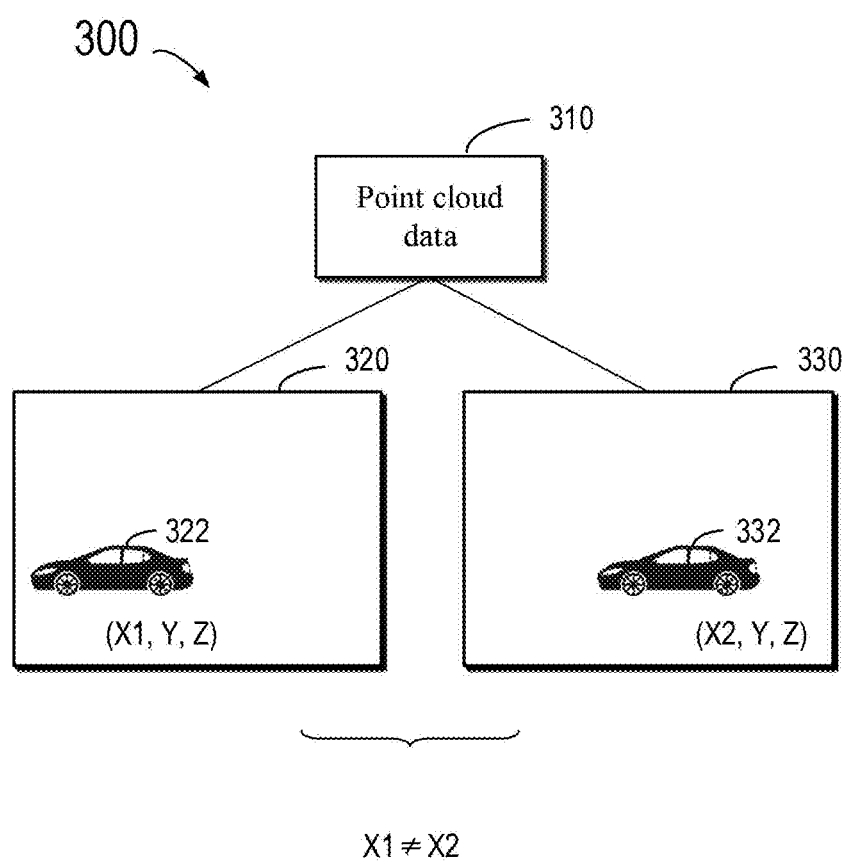
FIG. 3 schematically illustrates a block diagram of a solution for processing point cloud data according to an embodiment of the present disclosure.

According to an implementation of some embodiments of the present disclosure, a method and apparatus for processing point cloud data are provided. An overview of some embodiments of the present disclosure is generally described below with reference to FIG. 3. FIG. 3 schematically illustrates a block diagram of a solution 300 for processing point cloud data according to an embodiment of the present disclosure. As shown in FIG. 3, the point cloud data 310 represents data from the acquisition device 110, and the point cloud data 310 may include multiple frames. The first frame 320 and the second frame 330 may be acquired from the point cloud data 310. Then, a first candidate object 322 and a second candidate object 332 corresponding to the first candidate object 322 may be extracted from the first frame 320 and the second frame 330, respectively. It should be noted that "corresponding" herein refers to the two candidate objects being point cloud data from the same real object (e.g., the same vehicle) in real space. For example, the first candidate object 322 and the second candidate object 332 shown in FIG. 3 are point cloud data for the vehicle 120 from two frames, respectively.

In FIG. 3, the locations of the first candidate object 322 and the second candidate object 332 in the coordinate system of the point cloud data are the first position (X1, Y, Z) and the second position (X2, Y, Z) respectively. It should be noted that the coordinate system refers to the coordinate system of the point cloud data, which corresponds to the real space, and the definition of the coordinate system in each frame in the point cloud data is unified. According to an implementation of some embodiments of the present disclosure, the coordinate system may be defined in different approaches. For example, the coordinate system may use a reference location in the real space (for example, the position that the acquisition entity 112 starts the acquisition process) as the origin of the coordinate system, and use the moving direction as the direction of the X-axis, and then is defined according to the Cartesian coordinate system. Alternatively, other location may be defined as the origin of the coordinate system, and the direction of the X-axis may be defined according to other directions.

Since the vehicle 120 is in a moving state, the vehicle 120 has different locations in different frames of the point cloud data 310, thus the value of X1 is not equal to X2 in the coordinate system. In this embodiment, the first candidate object 322 may be identified as a moving object based on detecting an offset between the first location (X1, Y, Z) and the second location (X2, Y, Z). Since the second candidate object 332 corresponds to the first candidate object 322, the second candidate object 332 may also be identified as the moving object. In other words, any one of the first candidate object and the second candidate object may be identified as the moving object. According to an implementation of some embodiments of the present disclosure, the moving object may be automatically identified from the point cloud data without additional manual labor.

Figure 4:
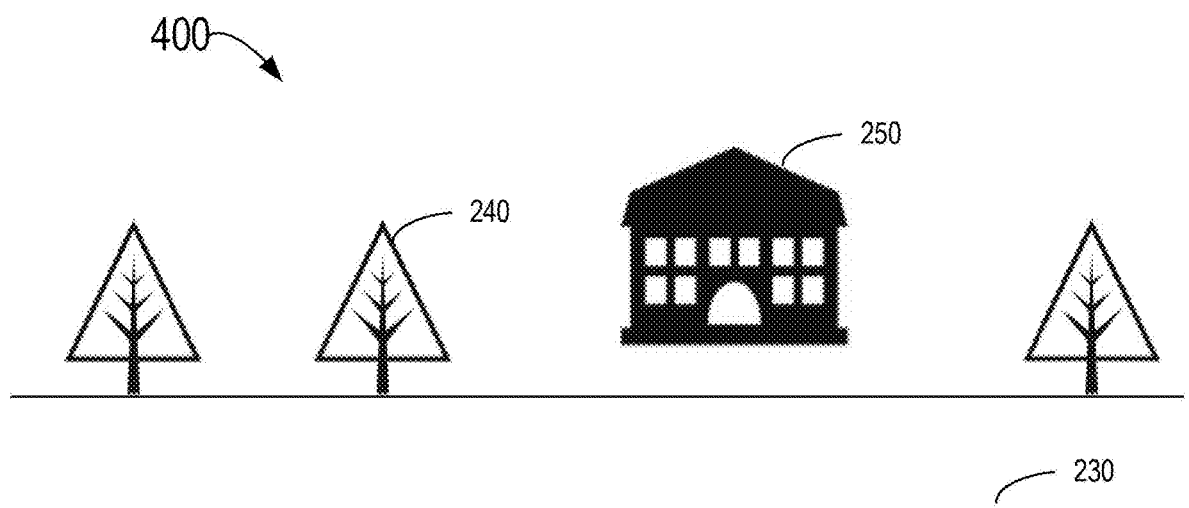
FIG. 4 schematically shows an illustration of a result of processed point cloud data according to an embodiment of the present disclosure.

Further, according to an implementation of some embodiments of the present disclosure, the identified moving object may be removed from the point cloud data. As shown in FIG. 4, an illustration of a result of processed point cloud data 400 according to an embodiment of the present disclosure is schematically showed. When the method of some embodiments of the present disclosure is performed for the point cloud data 200 as shown in FIG. 2, the processed point cloud data 400 as shown in FIG. 4 may be obtained. In FIG. 4, ghosting parts 220 and 222 associated with the vehicle and the bicycle have been identified and removed, thus only the parts 230, 240, and 250 associated with the road, the tree, and the building are included in the processed point cloud data 400.

Figure 5:
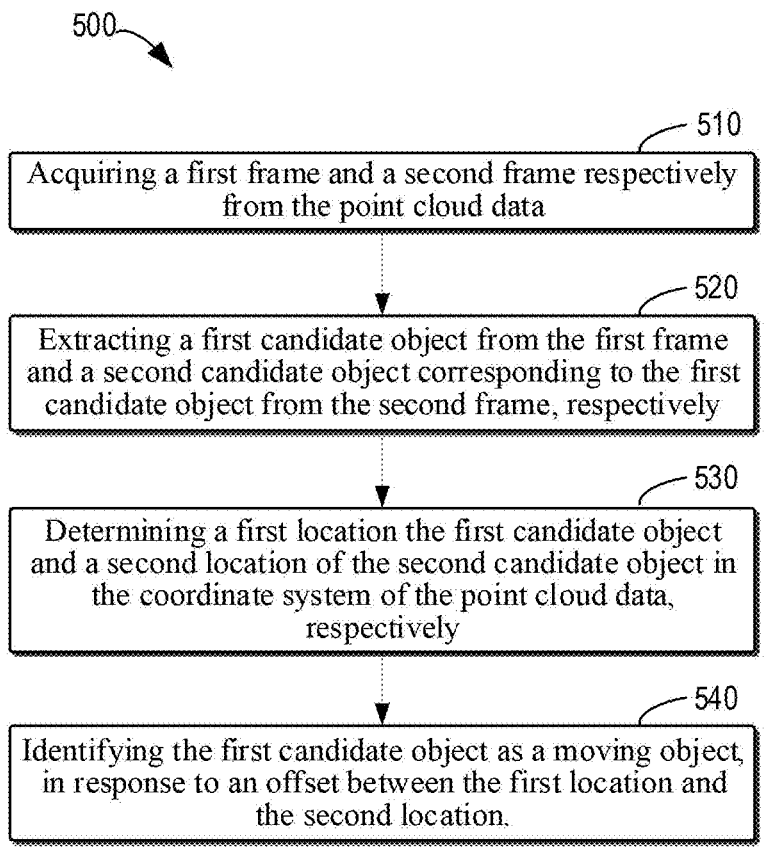
FIG. 5 schematically illustrates a flowchart of a method for processing point cloud data according to an embodiment of the present disclosure.

Specific steps of the method according to some embodiments of the present disclosure is described in detail below with reference to FIG. 5. FIG. 5 schematically illustrates a flowchart of a method 500 for processing point cloud data according to an embodiment of the present disclosure. At block 510, the first frame and the second frame are respectively acquired from the point cloud data. It should be noted that, similar to video data, the point cloud data may be stored frame by frame. In this step, each frame may be separately acquired based on the format definition of the point cloud data.

At block 520, a first candidate object and a second candidate object corresponding to the first candidate object are extracted in the first frame and the second frame, respectively. In this embodiment, first, potential objects may be identified in the frames by clustering the locations of the points in the frames. Then, the second candidate object corresponding to the first candidate object may be selected based on characteristics of the object in various aspects.

Specifically, according to an implementation of some embodiments of the present disclosure, in the coordinate system of point cloud data, points in the first frame and the second frame may be first clustered to form a first set of candidate objects and a second set of candidate objects respectively. The first set and the second set of candidate objects herein may include both moving objects and stationary objects. Then, the first candidate object may be selected from the first set of candidate objects, and the second candidate object corresponding to the first candidate object may be selected from the second set of candidate objects. The candidate object here refers to a potential moving object. It may be further determined in subsequent steps that whether the candidate object is moving or stationary. In this embodiment, the points in the frames may be clustered and the corresponding candidate object may be selected from the clustered points. In this process, no manual processing is required, which can greatly speed up the processing of point cloud data.

It should be noted that if the points in the point cloud data are clustered only by the locations, a large number of objects may be identified, and as a result, the recognized objects need to be processed one by one in the subsequent steps. In order to reduce the amount of computation for subsequent operations, the recognized objects may be filtered to find candidates that are likely to be moving objects.

According to an implementation of some embodiments of the present disclosure, first, ground objects are detected in the first frame and the second frame, respectively, where the ground objects refer to parts associated with the real ground in the point cloud data. In the first frame and the second frame, a first set of candidate objects and a second set of candidate objects are respectively formed based on one or more objects connected to the ground object. Since the point cloud data comes from an urban environment, only objects in contact with the ground (e.g., vehicles, bicycles, pedestrians, etc.) are considered in this embodiment, and moving objects such as airplanes in the air are not considered. Through this simplification, the efficiency of recognizing the moving objects may be greatly improved.

In this embodiment, whether an object is connected to the ground may be easily determined. After the ground object is detected, coordinates (x, y, z) of the ground object at various locations may be obtained. Thus, whether the object is connected to the ground object may be determined by comparing relationships between the z coordinate of the object and the coordinates of the locations on the ground object.

Specifically, assuming that a part associated with an object is identified in the point cloud data, in this case, whether the part is connected to the ground object is determined by comparing the lowest height value of the part with the height value of the corresponding position of the ground object. Assuming that the recognized object is a tree, whether the object is connected to the ground object may be determined by comparing the z coordinate of the root of the tree with the z coordinate of the corresponding position of the ground object. In this way, candidate objects associated with vehicles, bicycles, pedestrians, and the like in each frame may be identified quickly and easily.

Further, processing may be performed on the recognized candidate objects on by one in each frame. For example, for one of the first set of candidate objects, a candidate object corresponding thereto may be found in the second set of candidate objects.

According to an implementation of some embodiments of the present disclosure, the second candidate object corresponding to the first candidate object is selected based on at least one of the plurality of characteristics of the candidate object. Specifically, the characteristics may include size ratio of the first candidate object to the second candidate object, smoothness degree, reflection intensity, location and point cloud density. It should be understood for above characteristics, the objects may have different performances. For example, the surface of the moving object such as a vehicle is generally smooth, and the surface of the stationary object such as a tree is generally rough. Thus, the second candidate object may be more accurately selected based on the above characteristics to distinguish the second candidate object corresponding to the first candidate object.

Figure 6A:
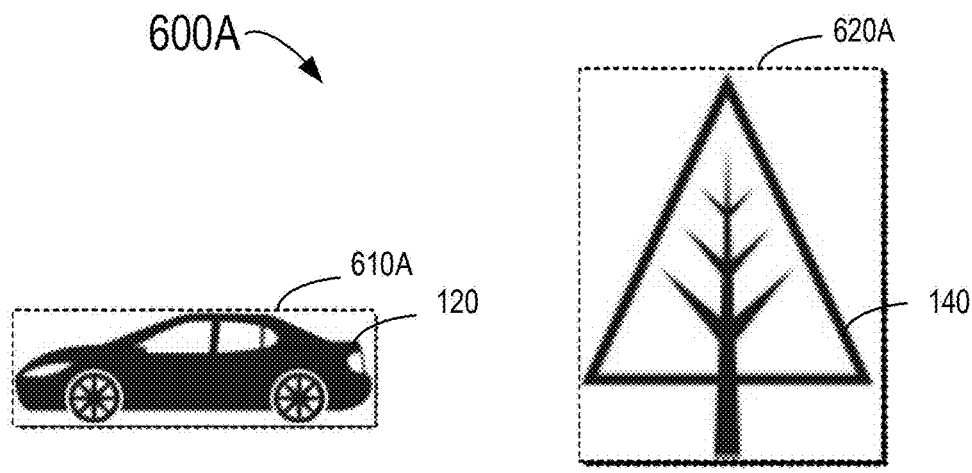
FIGS. 6A and 6B schematically illustrate diagrams of a method for determining a second candidate object corresponding to a first candidate object respectively according to an embodiment of the present disclosure.

In this embodiment, the characteristics of the candidate object may be calculated, and an object having similar characteristics to the first candidate object may be selected from the second set of candidate objects as the second candidate object. Here, the specific meaning of each characteristic is first introduced. FIG. 6A schematically shows an illustration of a method 600A for determining a second candidate object corresponding to a first candidate object according to an embodiment of the present disclosure.

In this embodiment, the size ratio refers to the ratio of the three-dimensional size in the bounding box of the identified object. Referring to FIG. 6A, the reference numeral 610A indicates a bounding box of the vehicle 120. Assuming that the point cloud data indicates that the vehicle 120 has a lateral distance of 4 meters and a height of 1.5 meters, then the size ratio of the vehicle 120 may be expressed as 4:1.5. The reference numeral 620A indicates a bounding box of the tree 140. Assuming that the point cloud data indicates that the tree 140 has a lateral distance of 4 meters and a height of 6 meters, then the size ratio of the tree 140 may be expressed as 4:6. As may be seen from the numerical comparison, the size ratio of the vehicle 120 and the tree 140 differ greatly.

Assuming that the size ratio of the first candidate object is 4:1.5, and a plurality of candidate objects are included in the second set of candidate objects, then a candidate object having a size ratio of 4:1.5 should be selected from the second set of candidate objects as the second candidate object, rather than selecting a candidate object having a size ratio of 4:6. It should be noted that although the size ratio is shown in two dimensions in FIG. 6A as an example, the size ratio is a three-dimensional form in the actual application environment. In the three-dimensional form, the size ratios of the vehicle 120 and the tree may be expressed as 4:1.7:1.5 (x, y, and z directions) and 4:4:6, respectively.

Figure 6B:
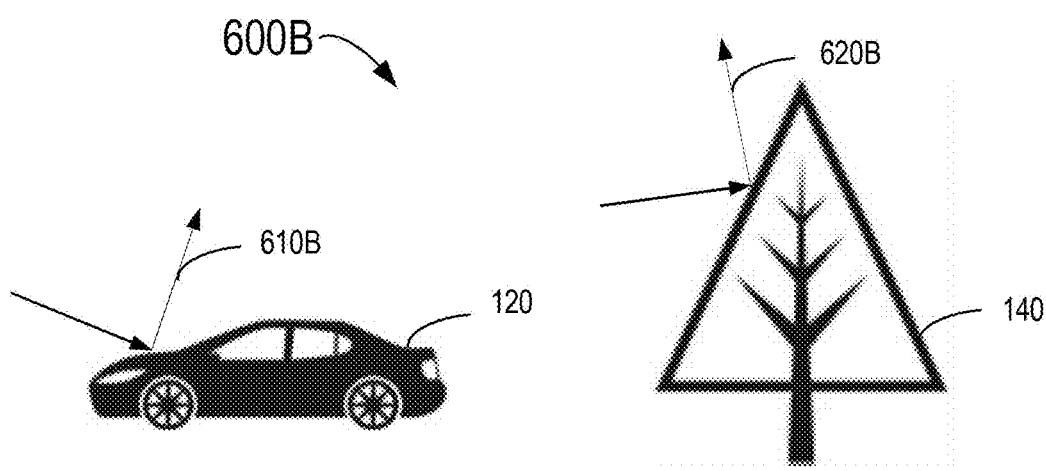

FIG. 6B schematically shows an illustration of a method 600B for determining a second candidate object corresponding to a first candidate object according to an embodiment of the present disclosure. In this embodiment, the reflection intensity refers to the degree of reflection of the surface of the object to the laser emitted by the acquisition device 110. For example, the metal surface of vehicle 120 may reflect a significant portion of the laser (as indicated by the arrow 610B) upon receipt of the laser from the acquisition device 110. Based on data sent by the acquisition device 110 and acquired "echo" data, the magnitude of the reflection intensity may be determined. The arrow 620B shows the reflection intensity of the tree 140 to the laser emitted by the acquisition device 110. Since generally there are many gaps between the leaves of the tree 140, the reflection intensity is much lower than the reflection intensity of the vehicle 120.

Assuming that the reflection intensity of the first candidate object is high, and a plurality of candidate objects are included in the second set of candidate objects, the candidate object having a higher reflection intensity should be selected from the second set of candidate objects as the second candidate object, rather than selecting a candidate object having a low reflection intensity. It should be noted that although the reflection intensity is shown in two dimensions in FIG. 6B as an example, the reflection in the actual application environment is the reflection in the three-dimensional space. Based on the type of acquisition device 110, those skilled in the art may define various data structures to describe the magnitude of the reflection intensity.

According to an implementation of some embodiments of the present disclosure, the smoothness degree may indicate the degree of smoothness of the surface of the object. For example, the smoothness degree may be described in multiple levels of high, medium, and low, then the smoothness degree of the vehicle 120 may be defined as "high" and the smoothness degree of the tree 140 may be defined as "low." Alternatively, the smoothness degree may also be described using continuous values. According to an implementation of some embodiments of the present disclosure, the smoothness degree may be defined in a continuous interval of [0, 100], the smaller the value is, the rougher the surface of the object is, and the larger the value is, the smoother the surface of the object is. In this case, the smoothness degree of the vehicle 120 may be defined as "90," and the smoothness degree of the tree 140 may be defined as "20."

According to an implementation of some embodiments of the present disclosure, the point cloud density refers to the density of acquired points. For example, the point cloud density acquired from an object with a smooth surface such as the vehicle 120 may be high, whereas for an object such as the tree 140, a portion of the laser emitted by the acquisition device 110 passes through the gaps between the leaves and echo signals may not be acquired. Thus, the point cloud density for the object such as the tree 140 is low. In this embodiment, an object having a point cloud density matching the point cloud density of the first candidate object may be selected as the second candidate object by the magnitude of the point cloud density.

According to an implementation of some embodiments of the present disclosure, the location refers to the location of each point associated with the object in the coordinate system of the point cloud data. For example, the location of the center of the object may be used as the location of the object. It should be noted that although an implementation according to some embodiments of the present disclosure determines whether an object is a moving object based on a position offset of the object between a plurality of frames, it is necessary to select an object whose position offset is within a reasonable range as the second candidate object.

Assuming that the first frame and the second frame are two consecutive frames and the acquisition time interval is 0.1 second. Assuming that the location of the candidate object 1 found in the first frame is (X1, Y, Z), and the location of the candidate object 2 found in the second frame is (X2, Y, Z). Assuming that the two candidate objects have similar size ratios, similar smoothness degrees, similar reflection intensities, and similar point clouds, but the distance between the locations X1 and X2 reaches 10 meters. In this case, if both the candidate object 1 and the candidate object 2 correspond to the same vehicle, the speed of the vehicle reaches 10 meters/0.1 second (i.e., 360 km/h.) For urban roads, it is impossible to achieve a vehicle speed of 360 km/h, thus it may be determined that the candidate object 2 cannot correspond to the candidate object 1. In this way, an object whose location is within a reasonable range may be selected as the second candidate object corresponding to the first candidate object.

It should be noted that the specific meanings and related operational details of various characteristics such as the size ratio, smoothness degree, reflection intensity, location, and point cloud density are described above in the various different embodiments. In accordance with an implementation of some embodiments of the present disclosure, the characteristics may be combined, for example, corresponding weighting coefficients may be set for the respective characteristics to reflect the characteristics of the object more comprehensively. Further, to select the second candidate object corresponding to the first candidate object, an object having characteristics matching respective characteristics of the first candidate object may be selected as the second candidate object.

According to an implementation of some embodiments of the present disclosure, the second candidate object may alternatively be selected based on the image as an assistance. Specifically, a first image associated with the first frame and a second image associated with the second frame may be respectively acquired. Further, when selecting the second candidate object, an object satisfying the following condition may be selected as the second candidate object: the imaging of the selected object in the second image matches the imaging of the first candidate object in the first image. In this embodiment, the accuracy of selecting the second candidate object may be further improved by referring to the images associated with the respective frames.

It should be noted that the acquisition device 110 may be provided with an image acquisition device, and the image acquisition device may coordinate with the laser acquisition device in the acquisition device 110 to acquire images corresponding to frames in the point cloud data. In this case, the second candidate object may alternatively be selected based on the content in the image. The image acquisition device and the laser acquisition device are located in close proximity and in a uniform orientation. Assuming that the image acquisition device captures a red car in each frame image, the objects corresponding to the red car may be respectively selected as the first candidate object and the second candidate object from the first frame and the second frame of the point cloud data.

According to an implementation of some embodiments of the present disclosure, the first frame and the second frame may be two consecutive frames in the point cloud data. According to an implementation of some embodiments of the present disclosure, the first frame and the second frame may be two inconsecutive frames in the point cloud data, as long as the time sequence and time interval of each frame may be determined by the sequence number or other attributes of the respective frames.

Returning to FIG. 5, at block 530, a first location of the first candidate object and a second location of the second candidate object in the coordinate system of the point cloud data are determined, respectively. According to an implementation of some embodiments of the present disclosure, the location of the center of each candidate object may be determined as the location of the candidate object. It should be noted that the location of the center may be calculated in a variety of ways. For example, all or a portion of the points associated with the object may be acquired and the location of the center is calculated based on the locations of the points in the coordinate system. Alternatively, the locations of the points may further be weighted based on parameters such as point cloud density, or other portion of the object may be determined as the location of the object based on other statistical methods.

At block 540 in FIG. 5, if there is an offset between the first location and the second location, the first candidate object is identified as a moving object. In this embodiment, it may be determined whether there is the offset before the locations of the two candidate objects in the two frame images, and if there is the offset, the first candidate object may be identified as the moving object; otherwise, the first candidate object may be identified as a stationary object. It should be noted that although it is described in the context of some embodiments of the present disclosure that the first candidate object is identified as the moving object, since the second candidate object corresponds to the first candidate object, and both objects are the same real object in the two frames of the point cloud data, thus the second candidate object may also be identified as the moving object.

Figure 7:
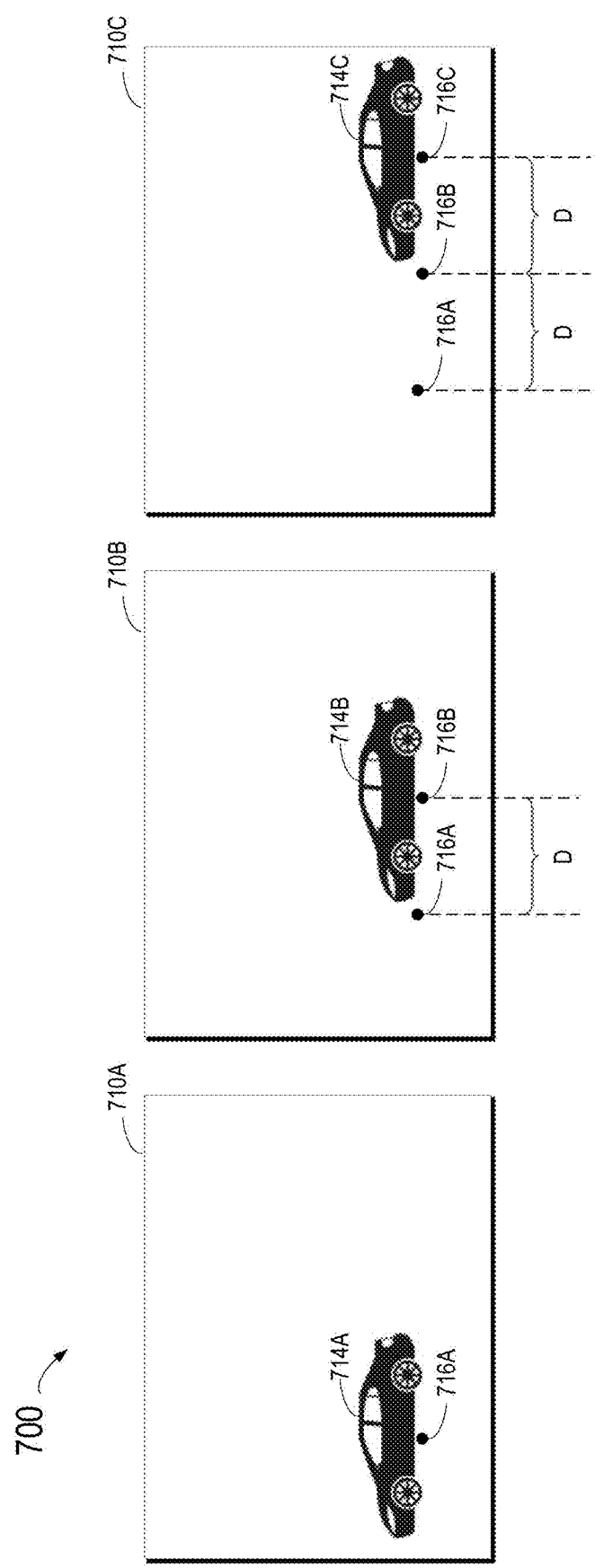
FIG. 7 schematically shows an illustration of a method for processing a first frame, a second frame, and a third frame in point cloud data according to an embodiment of the present disclosure.

Referring to FIG. 7, a first candidate object 714A and a second candidate object 714B are respectively extracted from the first frame 710A and the second frame 710B, and the locations of the two candidate objects are determined as the first location 716A and the second location 716B respectively. As shown in the figure, since there is an offset D between the two locations, any one of the first candidate object and the second candidate object may be identified as a moving object.

There may be cases where there is an offset between the two candidates, but the offset may be caused by certain noise or interference from other factors. Thus, it may not be determined that the first candidate object and the second candidate object are moving objects only by detecting an offset in two frames that are continuous or very close in time interval. Further, the contents of a plurality of frames may be monitored in order to determine the moving object more accurately.

According to an implementation of some embodiments of the present disclosure, a third frame may be acquired from the point cloud data, where the third frame may be a subsequent frame immediately adjacent to the second frame or other inconsecutive frame subsequent to the second frame. Then, the third candidate object corresponding to the first candidate object may be extracted in the third frame according to the method described in the preceding text. If a third location of the third candidate object in the coordinate system is associated with the offset, the first candidate object is identified as the moving object. In this embodiment, by further referring to more frames in the point cloud data, on the one hand, misjudgments caused by performing determination based on only two frames of data may be filtered, and on the other hand, more frames including the moving object may be further determined, which help to eliminate parts associated with the moving object from the point cloud data.

Further details of this embodiment is described in detail below with reference to FIG. 7. FIG. 7 schematically shows an illustration of a method 700 for processing a first frame, a second frame, and a third frame in point cloud data according to an embodiment of some embodiments of the present disclosure. As shown in FIG. 7, reference numerals 710A, 710B, and 710C respectively show three consecutive frames in the point cloud data. In this example, the frames 710A, 710B, and 710C are arranged in chronological order. For convenience of description, only the extracted candidate objects are shown in FIG. 7 without showing other data.

As shown in FIG. 7, the first, second, and third candidate objects 714A, 714B, and 714C are extracted in the first, second, and third frames 710A, 710B, and 710C, respectively, and the locations of the three candidate objects in the coordinate system of the point cloud data are 716A, 716B, and 716C, respectively. In this case, whether the candidate objects are point cloud data associated with the moving object may be determined based on the offsets between the locations.

Referring to FIG. 7, the offset between the first location 716A and the second location 716B is D, and the offset between the second location 716B and the third location 716C is also D. Then, the third location 716C of the third candidate object 714C in the coordinate system may be considered associated with the previously determined offset D (i.e., the offset between the second location 716B and the first location 716A.) Thus, it may be determined that the first, second, and third candidate objects 714A, 714B, and 714C are associated with the same moving entity object. Further, the candidate objects may be identified as moving objects.

It should be noted that although only the offset along the x-axis direction in the coordinate system is schematically illustrated in FIG. 7, according to an implementation of some embodiments of the present disclosure, there may be offsets in the x, y, or z-axis directions in the coordinate system.

According to an implementation of some embodiments of the present disclosure, a predicted location of the third candidate object in the third frame may be determined. If the predicted location is consistent with the third location, the first candidate object is identified as a moving object. In this embodiment, whether the third candidate object also corresponds to the moving object like the first candidate object may be determined by simple determination, thereby improving the accuracy of the recognition.

With further reference to the example of FIG. 7, assuming that the acquisition entity 112 is moving at a uniform speed, the predicted location of the third candidate object in the third frame 710C may be predicted based on the offset between the first frame 710A and the second frame 710B. Then, based on whether the predicted location is consistent with the actually detected third location 716C of the third candidate object 714C, whether to identify the first candidate object 714A, the second candidate object 714B, and the third candidate object 714C as moving objects may be determined. In this example, the offset D may be added based on the second location 716B to determine the predicted location. Then, the predicted location is consistent with the actually detected third location 716C. Thus, the first candidate object 714A, the second candidate object 714B, and the third candidate object 714C may be identified as moving objects.

According to an implementation of some embodiments of the present disclosure, an object speed of the first candidate object may be determined, and further, the predicted location may be determined based on the object speed. In this embodiment, since the time interval between the first frame and the second frame is known (for example, 0.1 second,) the object speed may be determined based on the offset and the time interval in the case where the offset is known. As a continuation of the example above, the object speed=D/0.1=10D. In other words, the object speed is 10D/sec.

It should also be noted that since the acquisition device 110 is fixed on the acquisition entity 112, a moving acquisition device 110 acquires the first frame and the second frame in different locations. Thus, for determining the second location of the second candidate object in the coordinate system, the motion speed of the acquisition entity 112 may also be considered. Since the motion speed of the acquisition entity 112 is known, the second location of the second candidate object in the coordinate system may be determined based on a simple operation. Similarly, the third location 716C of the third candidate object 714C in the third frame 710C may also be determined.

Figure 8:
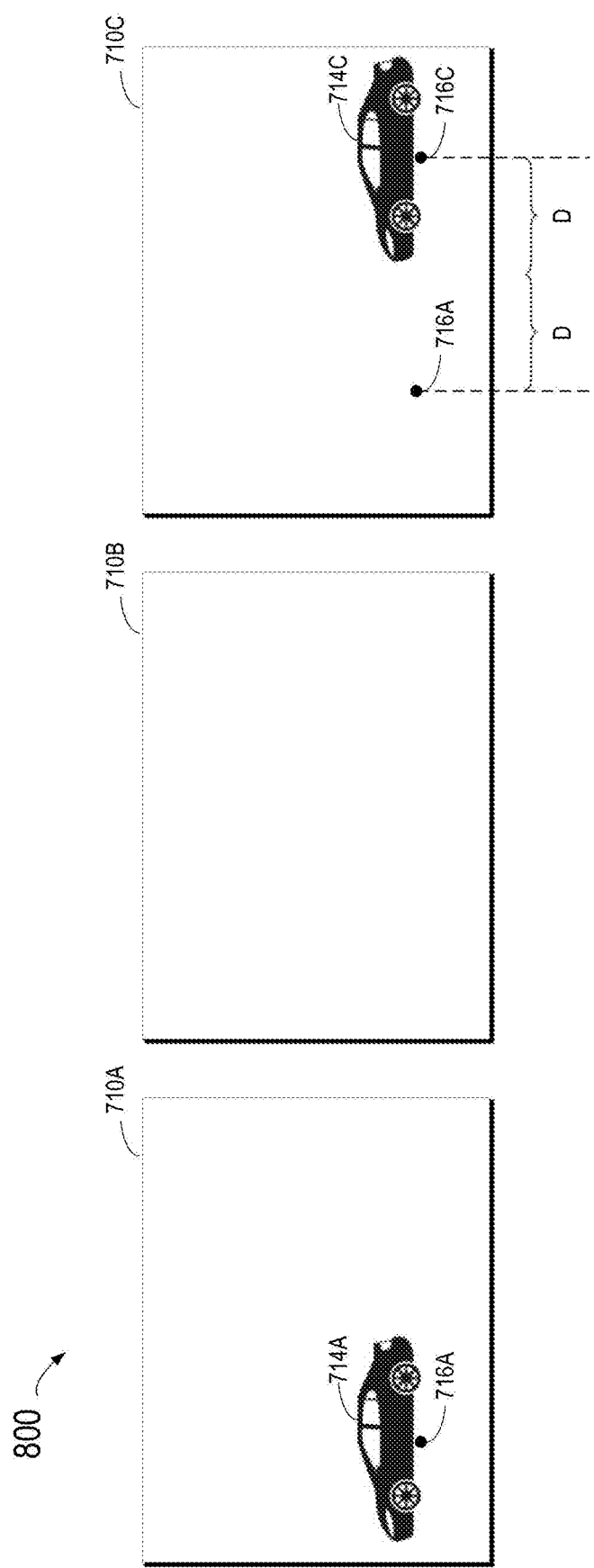
FIG. 8 schematically shows an illustration of a method for processing a first frame and a third frame in point cloud data according to an embodiment of the present disclosure.

It should be noted that although the case where the first frame and the second frame are two consecutive frames is described above, according to an implementation of some embodiments of the present disclosure, the two frames may alternatively be inconsecutive frames. How to determine a moving object based on two inconsecutive frames is described hereinafter with reference to FIG. 8. FIG. 8 schematically illustrates an illustration of a method 800 for processing a first frame and a third frame in point cloud data according to an embodiment of the present disclosure.

In the example of FIG. 8, the second frame 710B is lost or damaged for reasons, and then the first frame 710A and the third frame 710C are two inconsecutive frames. Based on the sequence numbers or timestamp data of the frames, the time interval between the first frame 710A and the third frame 710C may be determined. For example, the time interval is 0.2 seconds, then the offset between the first location 716A of the first candidate object 714A and the third location 716C of the third candidate object 714C may be determined as 2D based on the method described above. Based on the offset, any one of the first candidate object and the second candidate object may be identified as a moving object.

Figure 9:
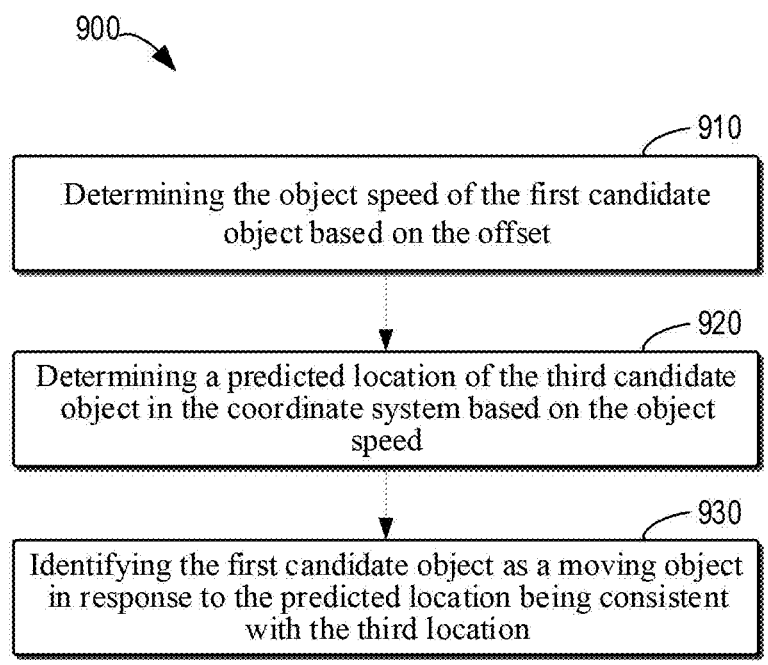
FIG. 9 schematically illustrates a flowchart of a method for identifying a moving object based on a predicted location according to an embodiment of the present disclosure.

FIG. 9 schematically illustrates a flowchart of a method 900 for identifying a moving object based on a predicted location according to an embodiment of the present disclosure. As shown in FIG. 9, at block 910, the object speed of the first candidate object is determined based on the offset. Specifically, the object speed may be determined based on the offset value and the time interval between the two frames in accordance with the method described above. At block 920, a predicted location of the third candidate object in the coordinate system may be determined based on the object speed. Then, it is also necessary to consider the time interval between the third frame and the second frame. For example, assuming that the third frame is a frame immediately subsequent to the second frame, the time interval is 0.1 second, and the predicted location has an offset D from the second location. As another example, assuming that the third frame is a frame 5 cycles after the second frame, the time interval is 0.5 seconds, and the predicted location has an offset 5D from the second location. At block 930, the first candidate object is identified as a moving object in response to the predicted location being consistent with the third location.

According to an implementation of some embodiments of the present disclosure, a set of points associated with the moving object in the point cloud data may be determined based on the first candidate object and the second candidate object. Further, in order to generate point cloud data including only stationary objects, the set of points associated with the moving object may also be removed from the original point cloud data. In the case where the moving object are identified, the part associated with the moving object may be removed from the point cloud data. In this way, an undesired part of the originally acquired point cloud data may be eliminated and point cloud data of a "clean" urban environment may be generated for other purposes.

Figure 10:
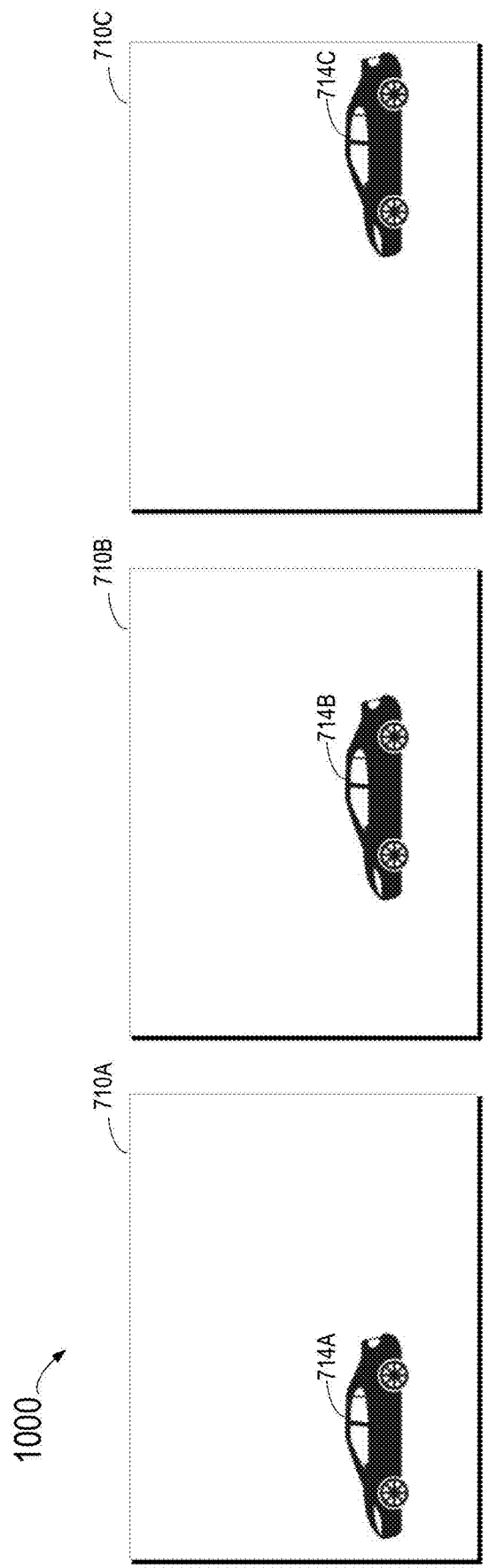
FIG. 10 schematically illustrates a block diagram of a method for determining a set of points associated with a moving object according to an embodiment of the present disclosure.

How to determine the set of points associated with the moving object is described below with reference to FIG. 10. FIG. 10 schematically illustrates a block diagram of a method 1000 for determining a set of points associated with a moving object according to an embodiment of the present disclosure. As a continuation of the example above, the first candidate object 714A in the first frame 710A, the second candidate object 714B in the second frame 710B, and the third candidate object 714C in the third frame 710C are identified as moving objects. Here, the points in the three candidate objects are the points associated with the moving objects and should therefore be removed from the point cloud data.

According to an implementation of some embodiments of the present disclosure, different methods may be adopted to remove the undesired part from the point cloud data. For example, first, the respective points of the corresponding candidate object in respective frames of the point cloud data may be removed, and the final point cloud data may be generated based on the updated data of each frame. As another example, the moving object may be modeled based on data in a frame including the moving object, and then the part belonging to the moving object is removed from the point cloud data.

According to an implementation of some embodiments of the present disclosure, in a plurality of frames in the point cloud data, a set of frames associated with the moving object is determined. Generally, for a time period, the moving object is located near the acquisition device 110, so that the moving object may be detected within a set of frames. A motion trajectory of the moving object is determined based on the locations of the moving object in a set of frames, then, the set of points associated with the moving object may be determined based on the motion trajectory. In this way, the position of the moving object may be determined more accurately, thereby contributing to determining the part associated with the moving object in each frame.

Specifically, the set of frames associated with the moving object may be found in frames of the point cloud data based on the principles described above. For example, with further reference to the example described in FIG. 7, consecutive frames after the second frame may be successively searched for a candidate object associated with the moving object. If the candidate object is found in a frame, the next frame is searched until there is no candidate object associated with the moving object in the next frame. Next, the location of the moving object in each of the set of frames may be determined to form a motion trajectory. Here, the motion trajectory describes a trajectory that the moving object moves during the acquisition of the point cloud data, and thus the set of points associated with the moving object may be obtained based on the motion trajectory. It should be noted that the ghosting in the final point cloud data in the existing technology is caused by the points in the set. Removing the points in the set from the point cloud data can eliminate the ghosting phenomenon.

Figure 11:
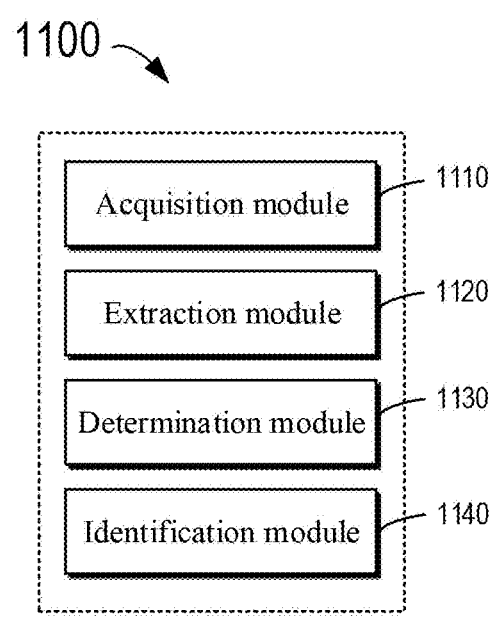
FIG. 11 schematically illustrates a block diagram of an apparatus for processing point cloud data according to an embodiment of the present disclosure.

FIG. 11 schematically illustrates a block diagram of an apparatus 1100 for processing point cloud data according to an embodiment of the present disclosure. Specifically, the apparatus 1100 includes: an acquisition module 1110, configured to acquire a first frame and a second frame respectively from the point cloud data; an extraction module 1120, configured to extract a first candidate object in the first frame and a second candidate object corresponding to the first candidate object in the second frame, respectively; a determination module 1130, configured to determine a first location of the first candidate object and a second location of the second candidate object in a coordinate system of the point cloud data, respectively; and an identification module 1140, configured to identify any one of the first candidate object and the second candidate object as a moving object, in response to an offset between the first location and the second location.

According to an implementation of some embodiments of the present disclosure, the extraction module 1120 includes: a clustering module and a selection module. Specifically, the clustering module is configured to cluster points in the first frame and the second frame to form a first set of candidate objects and a second set of candidate objects respectively in the coordinate system. The selection module is configured to select the first candidate object from the first set of candidate objects, and select the second candidate object corresponding to the first candidate object from the second set of candidate objects.

According to an implementation of some embodiments of the present disclosure, the extraction module 1120 includes: a ground detection module and a forming module. Specifically, the ground detection module is configured to detect a ground object in the first frame and the second frame, respectively. The forming module is configured to form the first set of candidate objects and the second set of candidate objects respectively based on one or multiple objects connected to the ground object in the first frame and the second frame.

According to an implementation of some embodiments of the present disclosure, the extraction module 1120 includes: a characteristic-based selection module. The characteristic-based selection module is configured to select the second candidate object corresponding to the first candidate object based on at least one of the following characteristics: size ratio of the first candidate object to the second candidate object, smoothness degree, reflection intensity, location and point cloud density.

According to an implementation of some embodiments of the present disclosure, the extraction module 1120 includes: an image acquisition module and an image-based selection module. Specifically, the image acquisition module is configured to acquire a first image associated with the first frame and a second image associated with the second frame, respectively. The image-based selection module is configured to select the second candidate object to enable imaging of the second candidate object in the second image matching imaging of the first candidate object in the first image.

According to an implementation of some embodiments of the present disclosure, the acquisition module 1110 is further configured to acquire a third frame from the point cloud data. The extraction module 1120 is further configured to extract a third candidate object corresponding to the first candidate object in the third frame. The identification module is further configured to identify the first candidate object as the moving object, in response to a third location of the third candidate object in the coordinate system being associated with the offset.

According to an implementation of some embodiments of the present disclosure, the identification module further includes: a prediction module and a moving object identification module. Specifically, the prediction module is configured to determine a predicted location of the third candidate object in the coordinate system. The moving object identification module is configured to identify any one of the first candidate object, the second candidate object, and the third candidate object as the moving object, in response to the predicted location being consistent with the third location.

According to an implementation of some embodiments of the present disclosure, the prediction module includes: a speed determination module and a location determination module. The speed determination module is configured to determine an object speed of the first candidate object based on the offset. The location determination module is configured to determine the predicted location based on the object speed.

According to an implementation of some embodiments of the present disclosure, the apparatus 1100 further includes: a set determination module and a removal module. Specifically, the set determination module is configured to determine, based on the first candidate object and the second candidate object, a set of points associated with the moving object in the point cloud data. The removal module is configured to remove the set of points from the point cloud data.

According to an implementation of some embodiments of the present disclosure, the set determination module includes: a frame determination module, a trajectory determination module and a trajectory-based set determination module. Specifically, the frame determination module is configured to determine, in a plurality of frames in the point cloud data, a set of frames associated with the moving object. The trajectory determination module is configured to determine a motion trajectory of the moving object based on locations of the moving object in the set of frames. The trajectory-based set determination module is configured to determine the set of points associated with the moving object based on the motion trajectory.

Figure 12:
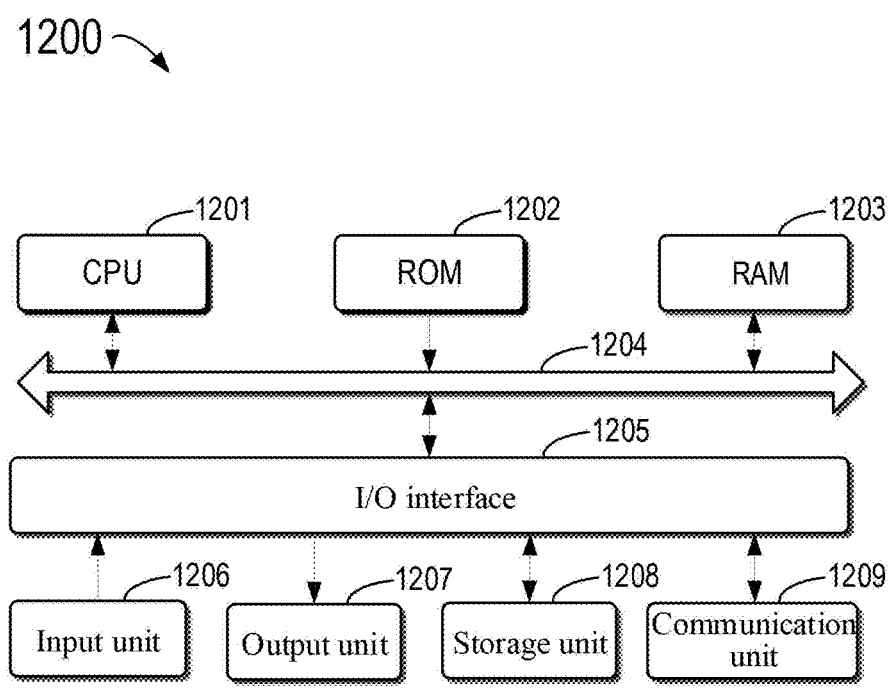
FIG. 12 illustrates a block diagram of a computing device capable of implementing various embodiments of the present disclosure.

FIG. 12 shows a schematic block diagram of a device 1200 capable of implementing various embodiments of the present disclosure. The device 1200 may be used to implement the computing device 102. As shown in the figure, the device 1200 includes a central processing unit (CPU) 1201 that may perform various appropriate actions and processing in accordance with computer program instructions stored in a read only memory (ROM) 1202 or computer program instructions loaded into a random access memory (RAM) 1203 from a storage unit 1208. In the RAM 1203, various programs and data required for the operation of the device 1200 may also be stored. The CPU 1201, the ROM 1202, and the RAM 1203 are connected to each other through a bus 1204. An input/output (I/O) interface 1205 is also coupled to the bus 1204.

A plurality of components in the device 1200 are coupled to the I/O interface 1205, including: an input unit 1206, such as a keyboard or a mouse; an output unit 1207, such as various types of displays, or speakers; the storage unit 1208, such as a disk or an optical disk; and a communication unit 1209 such as a network card, a modem, or a wireless communication transceiver. The communication unit 1209 allows the device 1200 to exchange information/data with other devices over a computer network such as the Internet and/or various telecommunication networks.

The processing unit 1201 performs the various methods and processes described above, such as the process 800 and/or the process 900. For example, in some embodiments, the process 800 and/or the process 900 may be implemented as a computer software program that is tangibly embodied in a machine readable medium, such as the storage unit 1208. In some embodiments, some or all of the computer programs may be loaded and/or installed onto the device 1200 via the ROM 1202 and/or the communication unit 1209. When a computer program is loaded into the RAM 1203 and executed by the CPU 1201, one or more of the actions or steps of the process 800 and/or the process 900 described above may be performed. Alternatively, in other embodiments, the CPU 1201 may be configured to perform the process 800 and/or the process 900 by any other suitable means (e.g., by means of firmware).

The functions described herein above may be performed, at least in part, by one or more hardware logic components. For example, and without limitation, types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of some embodiments of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of some embodiments of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely example forms of implementing the claims.

What is claimed is:

1. A method for processing point cloud data, the method comprising:
    acquiring a first frame and a second frame respectively from the point cloud data;
    from a plurality of objects in the first and second frames, extracting a first candidate object in the first frame and a second candidate object corresponding to the first candidate object in the second frame, respectively;
    determining a first location of the first candidate object and a second location of the second candidate object in a coordinate system of the point cloud data, respectively;
    identifying any one of the first candidate object and the second candidate object as a moving object in response to determining an offset between the first location and the second location;
    removing the moving object from the point cloud data; and
    generating a three-dimensional map based on the point cloud data from which the moving object is removed,
    wherein extracting the first candidate object and the second candidate object comprises:

detecting a first ground object in the first frame and a second ground object in the second frame, respectively;

comparing a first height of a first object in the first frame with a first ground object height of the first ground object, and comparing a second height of a second object in the second frame with a second ground object height of the second ground object;

determining objects connected to one of the first ground object in the first frame and the second ground object in the second frame based on the comparing;

forming a first set of candidate objects and a second set of candidate objects respectively based on the objects connected to one of the first ground object in the first frame and the second ground object in the second frame; and selecting the first candidate object from the first set of candidate objects, and selecting the second candidate object corresponding to the first candidate object from the second set of candidate objects, wherein the extracting reduces computation associated with identification of the moving object from the plurality of objects in the first and second frames, and wherein the method is performed by at least one processor.

2. The method according to claim 1, wherein the selecting the second candidate object from the second set of candidate objects comprises:

selecting the second candidate object corresponding to the first candidate object based on a size ratio of the first candidate object to the second candidate object.

3. The method according to claim 1, wherein the selecting the second candidate object from the second set of candidate objects comprises:

acquiring a first image associated with the first frame and a second image associated with the second frame, respectively; and selecting the second candidate object based on determining that the second candidate object in the second image matches the first candidate object in the first image.

4. The method according to claim 1, wherein the identifying the first candidate object as the moving object comprises:

acquiring a third frame from the point cloud data;

extracting a third candidate object corresponding to the first candidate object in the third frame; and identifying any one of the first candidate object, the second candidate object, and the third candidate object as the moving object in response to determining that a third location of the third candidate object in the coordinate system is associated with the offset.

5. The method according to claim 4, wherein the identifying any one of the first candidate object, the second candidate object, and the third candidate object as the moving object comprises:

determining a predicted location of the third candidate object in the coordinate system; and identifying any one of the first candidate object, the second candidate object, and the third candidate object as the moving object in response to the predicted location being consistent with the third location.

6. The method according to claim 5, wherein the determining the predicted location of the third candidate object in the third frame comprises:

determining an object speed of the first candidate object based on the offset; and determining the predicted location based on the object speed.

7. The method according to claim 1, further comprising:

determining, based on the first candidate object and the second candidate object, a set of points associated with the moving object in the point cloud data; and removing the set of points from the point cloud data.

8. The method according to claim 7, wherein the determining the set of points associated with the moving object further comprises:

determining, in a plurality of frames of the point cloud data, the set of frames associated with the moving object;

determining a motion trajectory of the moving object based on locations of the moving object in the set of frames; and determining the set of points associated with the moving object based on the motion trajectory.

9. An apparatus for processing point cloud data, the apparatus comprising:

at least one processor; and a memory storing instructions, wherein the instructions when executed by the at least one processor, cause the at least one processor to perform operations, the operations comprising:

acquiring a first frame and a second frame respectively from the point cloud data;

from a plurality of objects in the first and second frames, extracting a first candidate object in the first frame and a second candidate object corresponding to the first candidate object in the second frame, respectively;

determining a first location of the first candidate object and a second location of the second candidate object in a coordinate system of the point cloud data, respectively;

identifying any one of the first candidate object and the second candidate object as a moving object in response to determining an offset between the first location and the second location;

removing the moving object from the point cloud data; and generating a three-dimensional map based on the point cloud data from which the moving object is removed, wherein extracting the first candidate object and the second candidate object comprises:

detecting a first ground object in the first frame and a second ground object in the second frame, respectively;

comparing a first height of a first object in the first frame with a first ground object height of the first ground object, and comparing a second height of a second object in the second frame with a second ground object height of the second ground object;

determining objects connected to one of the first ground object in the first frame and the second ground object in the second frame based on the comparing;

forming a first set of candidate objects and a second set of candidate objects respectively based on the objects connected to one of the first ground object in the first frame and the second ground object in the second frame; and selecting the first candidate object from the first set of candidate objects, and selecting the second candidate object corresponding to the first candidate object from the second set of candidate objects, wherein the extracting reduces computation associated with identification of the moving object from the plurality of objects in the first and second frames.

10. The apparatus according to claim 9, wherein the selecting the second candidate object from the second set of candidate objects comprises:
selecting the second candidate object corresponding to the first candidate object based on a size ratio of the first candidate object to the second candidate object.

11. The apparatus according to claim 9, wherein the selecting the second candidate object from the second set of candidate objects comprises:
acquiring a first image associated with the first frame and a second image associated with the second frame, respectively; and
selecting the second candidate object based on determining that the second candidate object in the second image matches the first candidate object in the first image.

12. The apparatus according to claim 9, wherein the identifying the first candidate object as the moving object comprises:
acquiring a third frame from the point cloud data;
extracting a third candidate object corresponding to the first candidate object in the third frame; and
identifying the first candidate object as the moving object in response to determining that a third location of the third candidate object in the coordinate system is associated with the offset.

13. The apparatus according to claim 12, wherein the identifying any one of the first candidate object, the second candidate object, and the third candidate object as the moving object comprises:
determining a predicted location of the third candidate object in the coordinate system; and
identifying any one of the first candidate object, the second candidate object, and the third candidate object as the moving object in response to the predicted location being consistent with the third location.

14. The apparatus according to claim 13, wherein the determining the predicted location of the third candidate object in the third frame comprises:
determining an object speed of the first candidate object based on the offset; and
determining the predicted location based on the object speed.

15. The apparatus according to claim 9, the operations further comprise:
determining, based on the first candidate object and the second candidate object, a set of points associated with the moving object in the point cloud data; and
removing the set of points from the point cloud data.

16. A non-transitory computer storage medium, storing a computer program thereon, the computer program, when executed by a processor, causes the processor to perform operations, the operations comprising:
acquiring a first frame and a second frame respectively from point cloud data;
from a plurality of objects in the first and second frames, extracting a first candidate object in the first frame and a second candidate object corresponding to the first candidate object in the second frame, respectively;
determining a first location of the first candidate object and a second location of the second candidate object in a coordinate system of the point cloud data, respectively;
identifying any one of the first candidate object and the second candidate object as a moving object in response to determining an offset between the first location and the second location;
removing the moving object from the point cloud data; and
generating a three-dimensional map based on the point cloud data from which the moving object is removed,
wherein extracting the first candidate object and the second candidate object comprises:
detecting a first ground object in the first frame and a second ground object in the second frame, respectively;
comparing a first height of a first object in the first frame with a first ground object height of the first ground object, and comparing a second height of a second object in the second frame with a second ground object height of the second ground object;
determining objects connected to one of the first ground object in the first frame and the second ground object in the second frame based on the comparing;
forming a first set of candidate objects and a second set of candidate objects respectively based on the objects connected to one of the first ground object in the first frame and the second ground object in the second frame; and
selecting the first candidate object from the first set of candidate objects, and selecting the second candidate object corresponding to the first candidate object from the second set of candidate objects,
wherein the extracting reduces computation associated with identification of the moving object from the plurality of objects in the first and second frames.

17. The method according to claim 1, wherein the selecting the second candidate object from the second set of candidate objects comprises:
selecting the second candidate object corresponding to the first candidate object based on a size ratio of the first candidate object to the second candidate object, a smoothness degree, a reflection intensity, a location and a point cloud density.

18. The apparatus according to claim 9, wherein the selecting the second candidate object from the second set of candidate objects comprises:
selecting the second candidate object corresponding to the first candidate object based on a size ratio of the first candidate object to the second candidate object, a smoothness degree, a reflection intensity, a location and a point cloud density.

19. The non-transitory computer storage medium according to claim 16, wherein the selecting the second candidate object from the second set of candidate objects comprises:
selecting the second candidate object corresponding to the first candidate object based on a size ratio of the first candidate object to the second candidate object, a smoothness degree, a reflection intensity, a location and a point cloud density.

* * * * *